(12) United States Patent
Soukup et al.

(10) Patent No.: US 8,401,086 B1
(45) Date of Patent: Mar. 19, 2013

(54) SYSTEM AND METHOD FOR INCREASING RESPONSIVENESS TO REQUESTS FOR STREAMING MEDIA

(75) Inventors: Martin Jan Soukup, Ottawa (CA); Chris McEvilly, Bagshot (GB)

(73) Assignee: Ciena Corporation, Hanover, MD (US)

( * ) Notice: Subject to any disclaimer, the term of this patent is extended or adjusted under 35 U.S.C. 154(b) by 870 days.

(21) Appl. No.: 12/341,537

(22) Filed: Dec. 22, 2008

Related U.S. Application Data

(60) Provisional application No. 61/015,902, filed on Dec. 21, 2007.

(51) Int. Cl.
*H04N 7/12* (2006.01)
(52) U.S. Cl. ......... 375/240.25; 375/240.01; 375/240.02; 370/432; 370/473; 725/139

(58) Field of Classification Search ....... 375/240.11–15, 375/240.29, 714–715, 717, 240.25, 26
See application file for complete search history.

(56) References Cited

U.S. PATENT DOCUMENTS

| | | | | |
|---|---|---|---|---|
| 6,160,844 | A * | 12/2000 | Wilkinson | 375/240 |
| 6,167,084 | A * | 12/2000 | Wang et al. | 375/240.02 |
| 2007/0277219 | A1* | 11/2007 | Toebes et al. | 725/139 |
| 2008/0175273 | A1* | 7/2008 | Johansson et al. | 370/473 |
| 2010/0189124 | A1* | 7/2010 | Einarsson et al. | 370/432 |

* cited by examiner

*Primary Examiner* — Christopher Brown
*Assistant Examiner* — Fahimeh Mohammadi
(74) *Attorney, Agent, or Firm* — Tyler S. Brown

(57) ABSTRACT

In a streaming media environment in which multiple channels of media content are available, the present invention reduces the time interval between a user requesting a new channel and the media content of the requested channel being made available to the user.

26 Claims, 11 Drawing Sheets

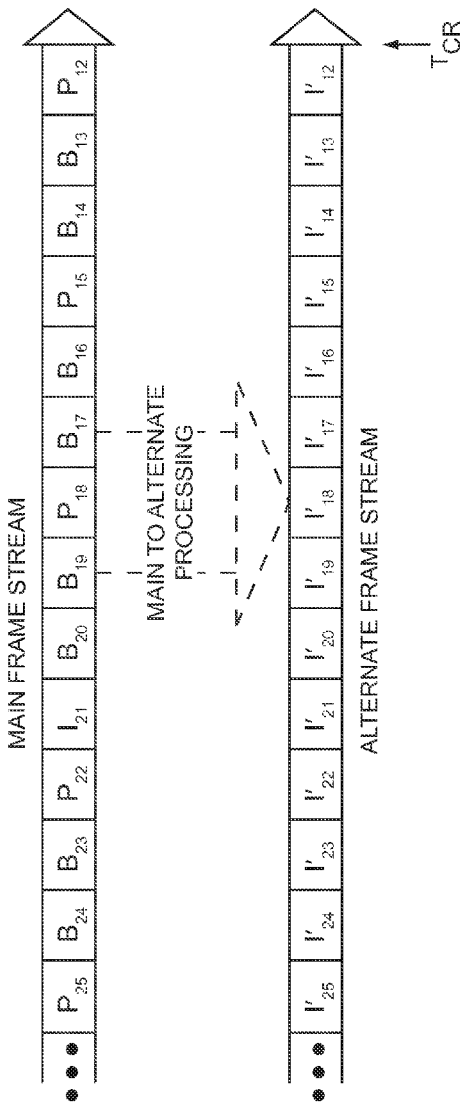
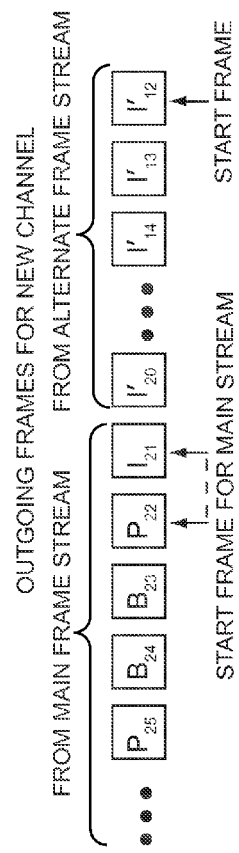
FIG. 5A
FIG. 5B

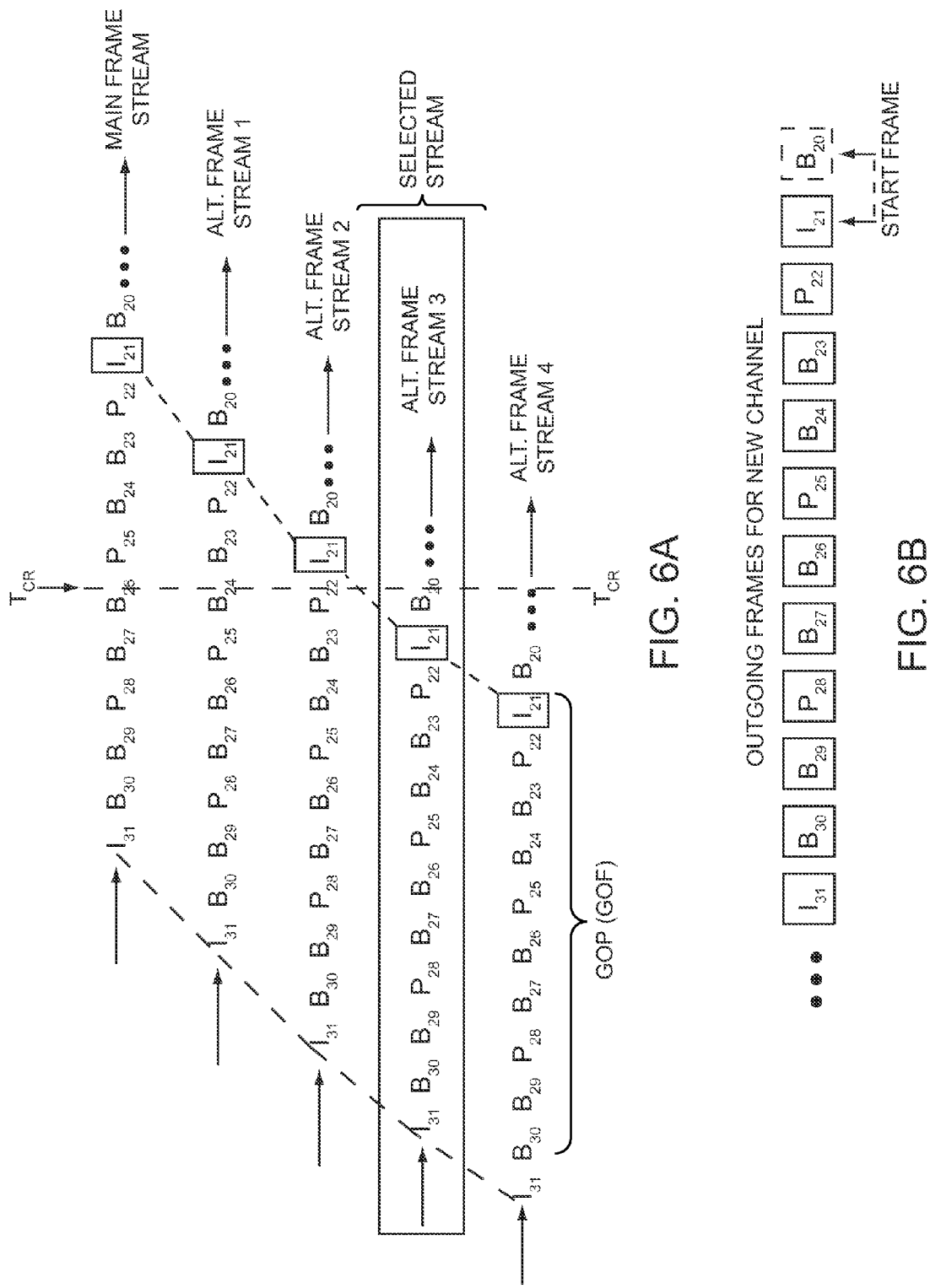

SYSTEM AND METHOD FOR INCREASING RESPONSIVENESS TO REQUESTS FOR STREAMING MEDIA

This application claims the benefit of U.S. provisional patent application Ser. No. 61/015,902, filed Dec. 21, 2007, the disclosure of which is incorporated herein by reference in its entirety.

FIELD OF THE INVENTION

The present invention relates to the delivery of encoded media streams, and in particular to a technique for providing a requested media stream in a manner that decreases the amount of time before the requested media stream can be properly decoded by customer premise equipment.

BACKGROUND OF THE INVENTION

With the evolution of packet-based communications and the Internet, virtually all types of media may be delivered to end users in real-time over the Internet. The most recent trend is to deliver broadcast television services to end users over the Internet in an effort to compete with over-the-air (OAR), cable, and satellite television services. Providing television services that have numerous channels over the Internet is generally referred to as Internet Protocol Television (IPTV). As with other types of services, such as telephony services that are delivered over the Internet, end users expect the quality and user experience to emulate that of legacy systems. With OAR, cable, and satellite television services, end users may change from one television channel to another with little, if not imperceptible, delay. One of the major issues with providing television services over the Internet is the delay incurred when the end user changes from one channel to another. If the time interval between an end user pushing a button to change channels and the television content for the new channel appearing on the screen for IPTV services is much greater than that for legacy systems, the end user will likely not be satisfied with the IPTV services. There are many sources of channel change delay in IPTV systems.

One significant source of delay is the manner in which the media content is encoded in IPTV systems that employ MPEG (Motion Pictures Expert Group) encoding, such as MPEG-2 or MPEG-4, for audio and video content. Video content is generally broken into a sequence of still frames, which are displayed in rapid succession to impart the illusion of motion without artifacts. There are three types of frames used in MPEG compression: I frames (intra-coded frames), P frames (predicative frames), and B frames (bi-directional frames). I frames are compressed without depending on any other frames. In other words, the I frames are compressed using just the information in the frame itself in essentially the same manner in which still images are compressed. Encoding a frame without depending on another frame is referred to as intra-coding. For video, there are generally two or more I frames during each second of video.

P frames and B frames are encoded based on information from other frames, and are thus inter-coded. In particular, P frames are encoded using forward prediction, wherein each P frame depends at least in part on a previous frame in the frame sequence. B frames are encoded using both forward and backward prediction, wherein each B frame depends at least in part on both a previous frame and a future frame in the frame sequence. B frames may also be encoded such that they depend only on future frames. The use of forward and backward prediction increases compression rates because it is only necessary to record those changes in the video content from one frame to the next.

MPEG defines the concept of a Group of Pictures (GOP). A GOP always starts with an I frame followed by zero or more B frames and zero or more P frames. The MPEG standard appears to allow more than one I frame in a GOP. A GOP is generally defined as a group of frames starting with an I frame followed by zero or more B frames and zero or more P frames up to, but not including, the next I frame in the video stream. The number of frames in a GOP may vary depending on the encoding parameters required for different video and display formats.

In each GOP, the I frame is the only frame that is not dependent on other frames in the GOP. All of the other B and P frames in the GOP are either directly dependent on an I frame or dependent on a frame that is directly or indirectly dependent on an I frame. If the I frame of a GOP is not available, none of the other B or P frames can be decoded. Thus, when an end user changes channels, the video receiver is not able to start decoding the video stream for the new channel until an I frame is received. If the channel change occurs after the I frame of a GOP has passed, the B and P frames for this GOP are not decodable. Decoding of the video stream will start when the first I frame of the next GOP is received. The following B and P frames for the next GOP can then be decoded based on the decoding of the I frame.

Thus, the delay between selecting a new channel and having the new channel displayed may approach the length of a GOP. It is not uncommon to have GOPs that have 15 or more frames. If the frame rate is 30 frames per second (fps), the delay incurred while waiting for an I frame can approach or exceed 0.5 seconds, which is a significant portion of the overall channel change delay in IPTV systems. Accordingly, there is a need for a technique to reduce the channel change delay associated with decoding media streams that employ encoding techniques where certain frames in a GOP are dependent on other frames in the GOP. There is a further need to decrease the overall channel change delay in IPTV systems.

For the following description, a group of frames (GOF) is defined as a series of frames that includes an I frame (intra-coded frame) and one or more frames that depend on the I frame. These dependent frames are referred to generally as D frames. For an MPEG video application, A GOP is a type of GOF wherein P frames (predicative frames) and B frames (bi-directional frames) are considered D frames.

SUMMARY OF THE INVENTION

In a streaming media environment in which multiple channels of media content are available, the present invention reduces the time interval between a user requesting a new channel and the media content of the requested channel being made available to the user. This time interval is referred to as a channel change delay.

In a first embodiment of the present invention, the encoded frames for some or all of the available channels are buffered in corresponding frame buffers for a period of time that may be longer than one group of frames (GOF), such as a GOP. The buffer sizes can be configured statically or may be adjusted dynamically by monitoring the incoming streams. In either case, the buffer size is preferably larger than the maximum GOF size for the stream it is buffering. At any given time, the frame buffer for a given channel will include a sequence of frames of at least one GOF. Each buffer will include an intra-coded frame (I frame) and associated inter-coded, or dependent frames (D frames), such as B and P frames, that are directly or indirectly dependent on the I frame for the given GOF.

When a new channel is requested, streaming of frames toward the customer premise equipment of the user is commenced immediately beginning with the most recent I frame in the frame buffer for the requested channel. Subsequent frames are sent at the same rate as incoming frames. Any frames prior to the first I frame in the frame buffer, and thus associated with a prior GOF whose I frame has already passed through the frame buffer, are not sent toward the customer premise equipment of the user. Different users may be fed different streams from the same buffer with different offsets depending on when they selected the channel. The number of different streams from the buffer will correspond to the size of the GOF. As such, frames can be pulled from any location within the frame buffer at any given time to facilitate rapid initiation of frame streaming, beginning with an I frame, toward the customer premise equipment for the requested channel.

In second embodiment of the present invention, two streams of frames are provided for some or all channels. A first frame stream is the main frame stream, which is encoded as a series of GOFs, each of which includes an I frame and the associated D frames. The second frame stream is an alternate frame stream and is encoded to provide a series of alternate I frames, wherein each of the alternate I frames corresponds to an I frame or D frame of the first stream. All of the frames in the alternate frame stream may be I frames. When a new channel is requested, streaming of frames toward the customer premise equipment of the user is commenced immediately beginning with the first alternate I frame in the alternate frame stream, if the first frame in the main frame stream is not an I frame. When the first I frame in the main frame stream arrives, streaming is switched from the alternate frame stream to the main frame stream. If the first frame in the main frame stream is an I frame when a new channel is requested, streaming of frames toward the customer premise equipment commences with the first frame in the main frame stream.

In a third embodiment of the present invention, multiple frame streams are provided for each of a number of channels. Each frame stream for a given channel is delayed in time with respect to the main frame stream for the given channel by a different delay time. The delay time is a fraction of the period of a GOF. Each frame stream for a given channel is identical and is encoded to provide a series of GOFs, each of which includes an I frame and the associated D frames. When a new channel is requested, the frame stream that will provide the next I frame with the least delay is selected as the frame stream to use for streaming frames toward the customer premise equipment. The duplicated and time-shifted frame streams may be provided by an external source or may be created from the incoming stream using a series of frame buffers, wherein each successive frame buffer stores a time-shifted portion of the incoming frame stream. The frame buffers for each of these embodiments are used to buffer ever-changing portions of continuously streamed content, and thus are periodically or continuously updated as content is received as will be appreciated by those skilled in the art.

In a fourth embodiment of the present invention, a given channel is represented by a group of sub-channels. The sub-channels are essentially identical, and are encoded to provide a series of GOFs, each of which includes an I frame and the associated B and P frames. Each of the sub-channels is a frame stream for the given channel and is delayed in time from the other sub-channels by a delay time. Preferably, the delay time is a fraction of the period of a single GOF. For three sub-channels, a second sub-channel is delayed one-third of a GOF from a third sub-channel, and a first sub-channel is delayed one-third of a GOF from the second sub-channel.

Each of the sub-channels is ultimately received at a termination point. The termination point will monitor each of the incoming sub-channels and determine when new GOFs arrive, preferably by detecting the receipt of an I frame, for each of the sub-channels. At any given time, the termination point is able to identify the sub-channel with the oldest GOF. The sub-channel with the oldest GOF is the sub-channel on which a new GOF has least recently arrived. The sub-channel with the oldest GOF is the next sub-channel to provide a new GOF, if the GOFs are of the same length. In response to receiving a channel selection request for a channel from a requestor, the termination point responds by selecting the sub-channel with the oldest GOF from the available sub-channels. The frame stream for the selected sub-channel is then delivered toward the requestor, wherein the next and subsequent GOFs in the frame stream are provided to the requestor in their entireties.

In a fifth embodiment of the present invention, the termination point is associated with a pair of frame buffers for buffering GOFs, which are preferably of a fixed length. The frame buffers are either the same size as a GOF or larger than a GOF. As GOFs from a channel are received, the frame buffers are alternately filled with sequential GOFs of the channel. For example, once a first frame buffer is filled with a first GOF of the channel, the other frame buffer starts being filled with a second GOF. Once the other frame buffer is filled with the second GOF, the first frame buffer starts being filled with a third GOF, and so on and so forth. Generally, one frame buffer will contain a complete GOF while the other is being filled with a subsequent GOF.

The frame buffers are filled as the frames for a GOF to be buffered are received. Once one frame buffer is filled with one GOF, the termination point will begin filling the other frame buffer with the next GOF as the frames for the next GOF are received. If the frame buffers are the same size as the GOFs, the termination point may begin filling the other frame buffer once the first frame buffer is full, and vice versa. Alternatively, the termination point may be able to detect the beginning or end of a GOF, and switch from filling one frame buffer to filling another accordingly.

The I frames of the GOFs may be stored at the beginning of the frame buffers. Upon receiving a channel selection request for the channel, the termination point will select the frame buffer that contains a complete GOF and begin streaming the frames of the complete GOF from the beginning of the selected frame buffer toward the requestor. While the frames for the complete GOF are being streamed from the selected frame buffer, the other frame buffer is being filled with the frames of the next GOF. Once streaming begins, the termination point will switch from one frame buffer to the other as each complete GOF in the frame buffer is streamed toward the requestor. As such, the termination point switches between the frame buffers for each successive GOF that is streamed toward the requestor.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 5A illustrates a main frame stream and alternate frame stream at a certain point in time for a given channel according to a third embodiment of the present invention.

FIG. 5B illustrates the outgoing frames for the new channel according to the third embodiment of the present invention.

FIG. 6A illustrates multiple frame streams provided for the same channel at a certain point in time according to a fourth embodiment of the present invention.

FIG. 6B illustrates the outgoing frames for the new channel according to the fourth embodiment of the present invention.

DETAILED DESCRIPTION OF THE PREFERRED EMBODIMENTS

Figure 1:
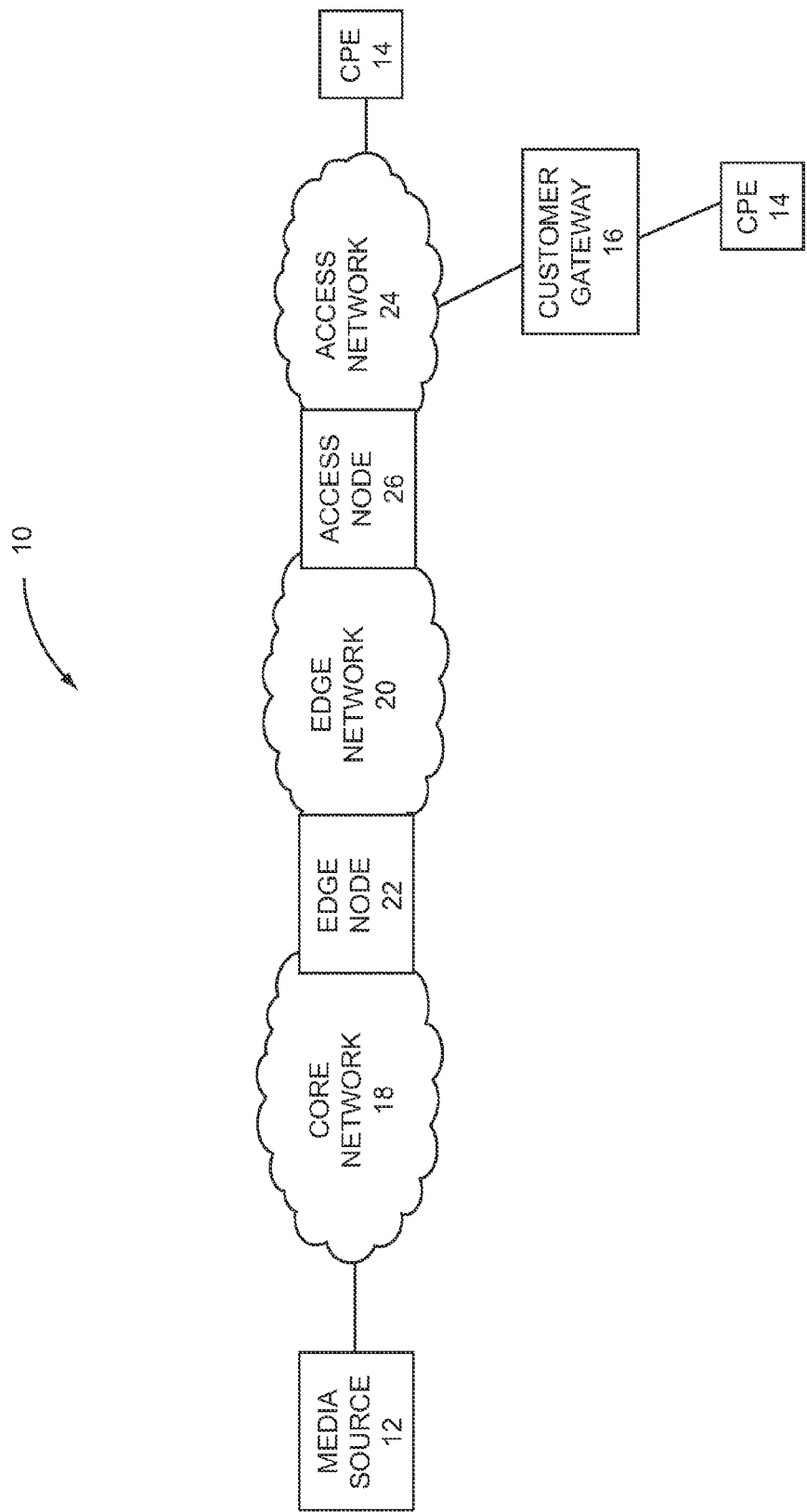
FIG. 1 illustrates an overview of a streaming media environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In a streaming media environment in which multiple channels of media content are available, the present invention reduces the time interval between a user requesting a new channel and the media content of the requested channel being made available to the user. This time interval is referred to as a channel change delay. Prior to delving into the details of the present invention, an overview of a streaming media environment is provided with reference to FIG. 1.

As illustrated, a streaming media environment 10 is capable of delivering streaming media, such as audio or video, from a media source 12 to customer premise equipment (CPE) 14 of various residential or commercial users, directly or indirectly via an appropriate customer gateway 16. The customer gateway 16 may represent a digital subscriber line access modem (DSLAM), cable gateway, or the like. For broadcast media services, such as television or radio, multiple channels are available for the user's listening or viewing enjoyment. The media is generally encoded and broken into packets at the media source 12 prior to delivery toward the CPE 14. Although those skilled in the art will recognize various forms of acceptable encoding, the encoding standards promulgated by the Motion Pictures Expert Group (MPEG) have received wide acceptance and are currently being used in Internet Protocol television (IPTV) and Internet radio systems. Of the various MPEG encoding formats, MPEG-2 is currently most prominent for encoding audio and video content although MPEG-4 is gaining acceptance.

As an example, video content is generally broken into a sequence of still frames, which are displayed in rapid succession to impart the illusion of motion without artifacts. There are three types of frames used in MPEG compression: I frames (intra-coded frames), P frames (predicative frames), and B frames (bi-directional frames). I frames are compressed without depending on any other frames. As such, the I frames are compressed using just the information in the frame itself in essentially the same manner in which still images are compressed. Encoding a frame without depending on another frame is called intra-coding. For video, there are generally two or more I frames during each second of video.

P frames and B frames are encoded based on information from other frames, and are thus inter-coded. In particular, P frames are encoded using forward prediction, wherein each P frame depends at least in part on a previous frame in the frame sequence. B frames are encoded using both forward and backward prediction, wherein each B frame depends at least in part on both a previous frame and a future frame in the frame sequence. The use of forward and backward prediction increases compression rates because it is only necessary to record those changes in the video content from one frame to the next. A single I frame is generally associated with a group of B and P frames, wherein an I frame and the subsequent B and P frames before the next I frame together form a Group of Pictures (GOP). The number frames in a GOP may vary depending on the encoding parameters required for different video and display formats. In each GOP, the I frame is the only frame that is not dependent on other frames in the GOP. All of the other B and P frames in the GOP are either directly dependent on the I frame or dependent on a frame that is directly or indirectly dependent on the I frame. A GOP always starts with an I frame followed by zero or more B frames and zero or more P frames. The MPEG standard appears to allow more than one I frame in a GOP. A (GOP) is defined as a group of video frames starting with an I frame followed by zero or more B frames and zero or more P frames up to, but not including, the next I frame in the video stream. The number of frames in a GOP may be fixed or may vary depending on the encoding parameters required for different video and display formats.

As noted above, a group of frames (GOF) is generally defined as a series of frames that includes an I frame (intra-coded frame) and one or more frames that depend on the I frame. These dependent frames are referred to generally as D frames. For an MPEG video application, A GOP is a type of GOF wherein P frames (predicative frames) and B frames (bi-directional frames) are considered D frames.

Once the media source 12 has generated or otherwise determined the sequence of frames to be delivered for the media stream, the frames are packetized and sent toward the CPE 14.

As illustrated in FIG. 1, the media source 12 may reside on a core network 18, which serves as a backbone or other long haul network for delivering the streaming media to an appropriate edge network 20. An edge node 22, such as an edge router, is often used to connect the core network 18 to the edge network 20. The edge network 20 may correspond to a particular metropolitan area or other geographically defined locale, and will function to carry the streaming media to appropriate access networks 24, which connect the edge network 20 to the customer premises at which the CPEs 14 reside. An access node 26, which may be an edge router or the like, is often used to connect the various access networks 24 to the associated edge network 20.

For broadcast type media services where there are multiple channels from which users may select, there must be a point in the streaming media environment 10 to which all of the media streams representing each of the available channels is sent. For reference, this point is referred to as a "service point," which is provided by an appropriate network node (not shown). At this service point, requests from the CPEs 14 are received when a new channel is selected. Once a new channel is selected, the media content for the newly selected channel is streamed toward the CPE 14, which upon receipt of the streaming media, will process it accordingly for presentation to the user or for local storage on a personal media recorder, such as a digital video recorder (DVR). This service point may reside at virtually any point in the streaming media environment 10. For example, the service point may reside in the customer gateway 16, within the access network 24, at the access node 26, within the edge network 20, at the edge node 22, within the core network 18, or in the media source depending on the desires and configuration of the service provider.

Regardless of the location of the service point, for a user to change from one channel to another, a request must be sent to the service point, and the service point must react by initiating a media stream for the newly requested channel toward the CPE 14 associated with the user in a direct or indirect fashion. The present invention helps to minimize the delay or latency associated with the user selecting a new channel, and in particular, the present invention reduces the time interval between a user requesting a new channel and the media content of the requested channel being made available to the user. As such, channel change delay is reduced both when first requesting a channel or in a situation where the user is receiving content from another channel when the new channel is requested.

As noted above, the delay associated with making the media content for a newly requested channel available to the user is at least partially dependent on how the media content is encoded and how quickly the first I frame reaches the CPE 14 of the user. For the present invention, different techniques are presented to significantly reduce the time it takes the first I frame in the media stream for the newly requested channel to reach the CPE 14 after a new channel is requested.

Figure 2:
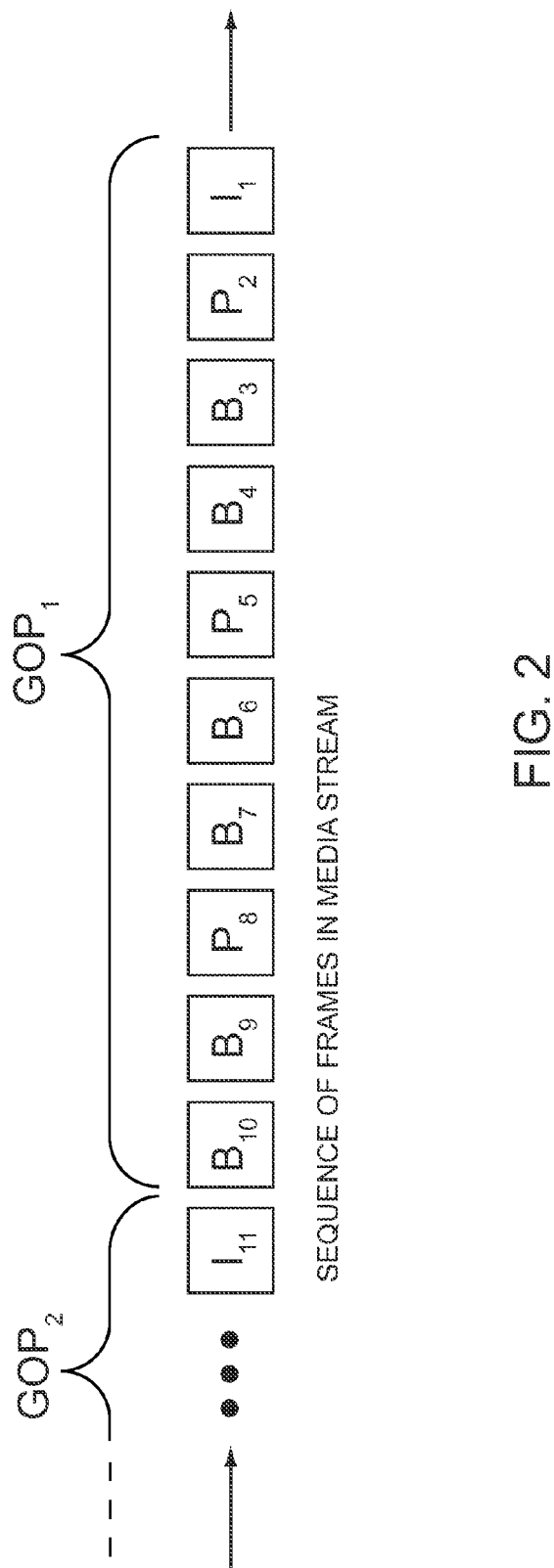
FIG. 2 illustrates a sequence of frames in a media stream.

For the following examples, assume an IPTV service providing any number of audio and video channels is implemented. With reference to FIG. 2, a sequence of frames in a media stream is depicted. Notably, each block represents a frame, which may be transported using one or more packets. The present invention operates on the frames, and as such, encoded frames of the media stream should not be confused with the packets used to carry those frames. As illustrated, an MPEG-2 framing sequence is presented. Each block represents one of an I frame ($I_X$), a P frame ($P_X$), or a B frame ($B_X$), wherein X represents a frame sequence number that dictates the order in which the frames are transmitted, but not necessarily the order in which they are encoded. Assume that the frames are transmitted in ascending order. In other words, I frame $I_1$ is followed by P frame $P_2$, P frame $P_2$ is followed by B frame $B_3$, and so on. As noted above, an I frame and its associated P and B frames represent a $GOF_Y$, where Y represents a GOF sequence number. For FIG. 2, $GOF_1$ represents the frame sequence: $I_1, P_2, B_3, B_4, P_5, B_6, B_7, P_8, B_9, B_{10}$. The next GOF, $GOF_2$, begins with I frame $I_{11}$. When streamed, the frames from one GOF are immediately streamed behind the frames of another GOF, such that all of the frames in the media stream are streamed in succession, as will be appreciated by those skilled in the art.

In a first embodiment of the present invention, the encoded frames for multiple ones of the available channels are buffered in corresponding frame buffers for a period of time. The buffer size is greater than the number of frames in a GOF and usually less than two times this number. At any given time, the frame buffer for a given channel will include at least all frames for one GOF. Each GOF will include an I frame and all associated B and P frames that are directly or indirectly dependent on the I frame for the given GOF. Beginning with the most recently buffered I frame in the frame buffer for the requested channel, the frames for the requested channel are immediately streamed toward the CPE 14 of the user when a new channel is requested. Any frames prior to the most recently buffered I frame in the frame buffer, and thus associated with a prior GOF whose I frame has already passed through the frame buffer, are not sent toward the CPE 14 of the user. As such, frames can be pulled from any location within the frame buffer at any given time to facilitate rapid initiation of frame streaming, beginning with an I frame, toward the CPE 14 for the requested channel.

Figure 3A:
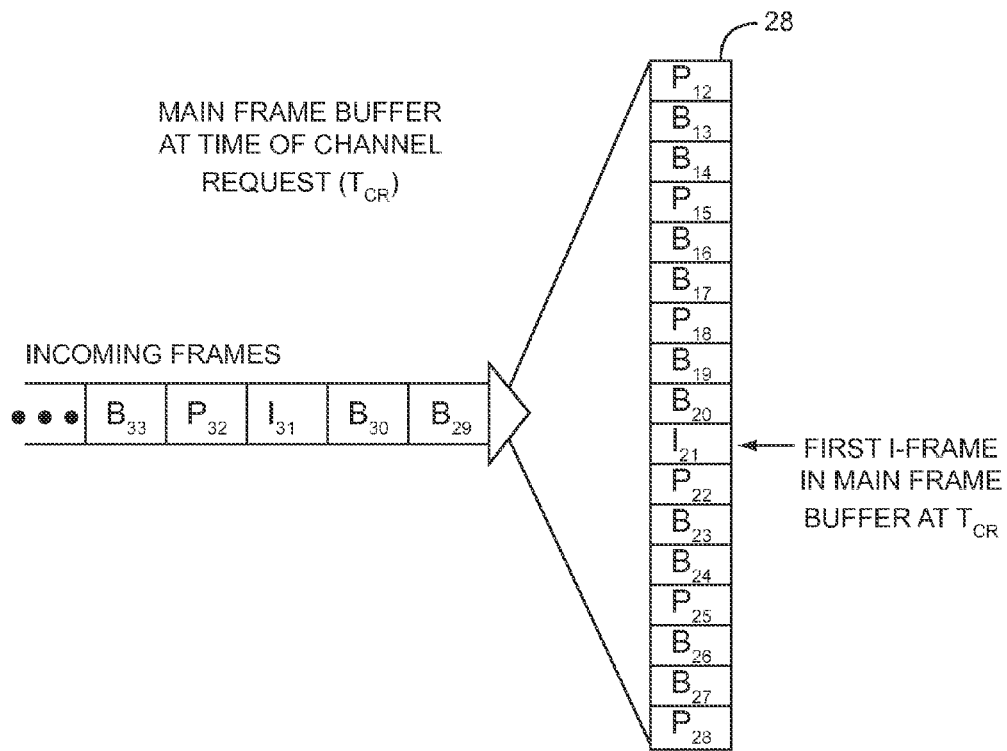
FIG. 3A illustrates a main frame buffer at a certain point in time while buffering incoming frames for a given channel according to a first embodiment of the present invention.

With reference to FIG. 3A, a main frame buffer 28 is shown at a certain point in time while buffering incoming frames for a given channel. In operation, incoming frames are initially stored at the bottom of the main frame buffer 28, and as each incoming frame is buffered, the previously buffered frames are shifted up one location until they are shifted out of the main frame buffer 28. As illustrated, frames 12-28 are buffered, and the next frame to be buffered is a B frame, $B_{29}$. The oldest frame in the buffer is the P frame $P_{12}$, while the most recently buffered frame is the P frame $P_{28}$. The most recently buffered I frame is $I_{21}$.

Figure 3B:
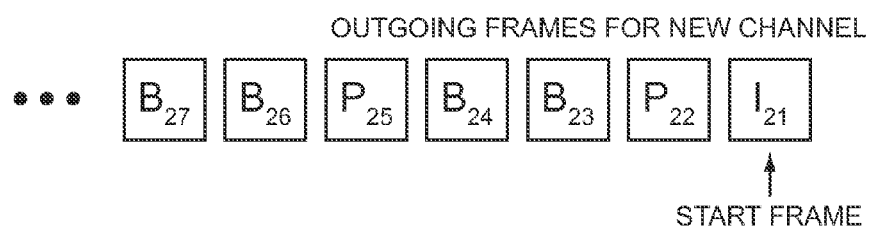
FIG. 3B illustrates the outgoing frames for the new channel according to the first embodiment of the present invention.

When a request to start receiving the media content for the channel associated with the main frame buffer 28 is received, a stream processor associated with the main frame buffer 28 will identify the most recent I frame in the main frame buffer 28, I frame $I_{21}$, and immediately begin streaming frames for the media content, starting with the I frame $I_{21}$, toward the CPE 14 of the user requesting the media content. The initial sequence of outgoing frames for the new channel is provided in FIG. 3B. As illustrated, the start frame for the streaming media is the I frame $I_{21}$, which is followed by the P frame $P_{22}$, B frame $B_{23}$, and so on. The older frames prior to the most recent I frame ($I_{21}$) in the main frame buffer 28 at the time of the channel request ($T_{CR}$) are not sent toward the CPE 14. Notably, the frames sent toward the CPE 14 are pulled from the buffer location where the most recent I frame is stored when the channel request was received ($T_{CR}$). By being able to start streaming from any location in the main frame buffer 28, there is minimal delay between receiving a request for a new channel and initiating a stream of frames that begins with an I frame toward the user.

Figure 4A:
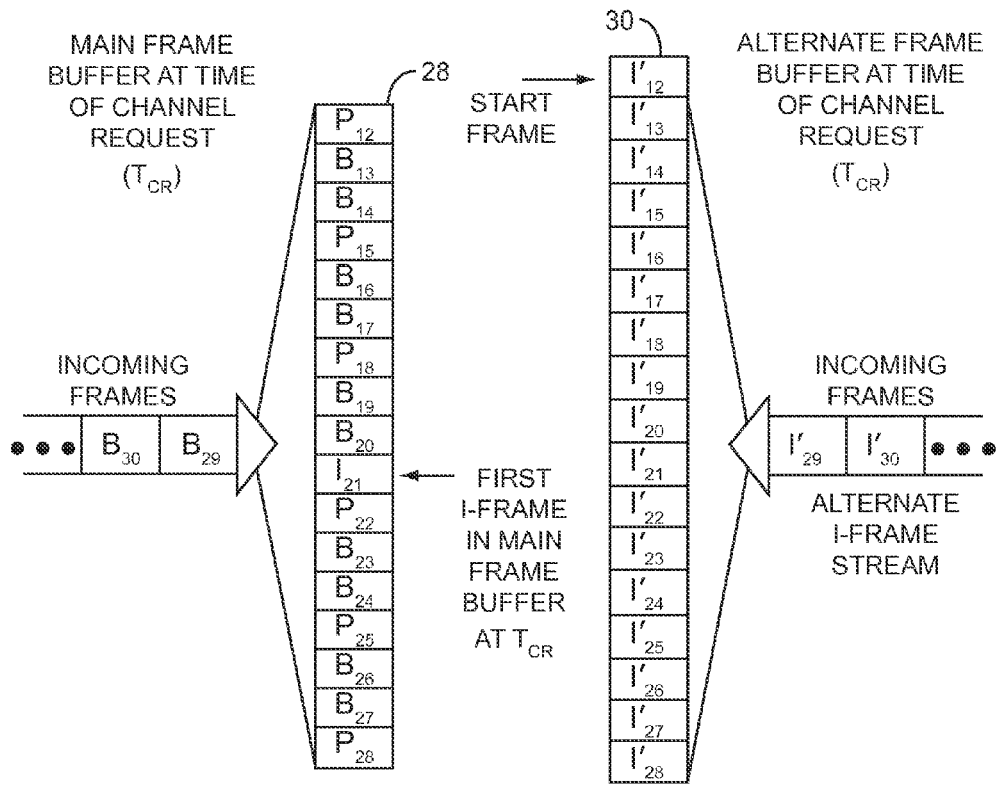
FIG. 4A illustrates a main frame buffer and alternate frame buffer at a certain point in time while buffering incoming frames for a given channel according to a second embodiment of the present invention.

In a second embodiment of the present invention, two streams of frames are provided for each of at least certain channels. Each stream represents the same content. As illustrated in FIG. 4A, a first frame stream is the main frame stream, which is encoded to provide a series GOFs, each of which includes an I frame and the associated dependent frames, such as the B and P frames. The second frame stream is an alternate I frame stream and is encoded to provide a series of alternate I frames, wherein each of the alternate I frames corresponds to one of the I, B, or P frames of the main frame stream. In one embodiment, the I frames of the main frame stream are the essentially the same as the corresponding alternate I frames of the alternate I frame stream. Further, the alternate I frames that correspond to the B and P frames of the main frame stream are intra-coded (I frame) versions of the corresponding B and P frames. These alternate I frames may be of a lesser quality than the original versions of the corresponding B and P frames. All of the frames in the alternate I frame stream may be I frames, as depicted. The I frames, B frames, and P frames of the main frame stream may be buffered for a period of time in the main frame buffer 28, while the corresponding alternate I frames may be buffered for a period of time in an alternate frame buffer 30. Further, the alternate I frames may be generated from the frames of the main frame stream or may be received separately therefrom.

When a channel request is received at time $T_{CR}$, one of the earlier alternate I frames, if the not the first frame, in the alternate frame buffer 30 is selected as the start frame for the stream of frames. Beginning with the start frame, the alternate I frames are immediately streamed toward the CPE 14 of the user. For this example, assume the first frame in the alternate frame buffer 30 ($I'_{12}$) is the start frame. When the alternate I frame $I'_{21}$ that corresponds to the first I frame ($I_{21}$) in the main frame buffer 28 is next to be streamed toward the CPE 14, the frame streaming switches from the alternate frame buffer 30 to the main frame buffer 28. As such, at least the B and P frames, and perhaps the I frame $I_{21}$, for the first full GOF of the requested channel are streamed from the main frame buffer 28, instead of the alternate frame buffer 30. Frames for all subsequent GOFs are streamed from the main frame buffer 28 until the channel is changed. Since an I frame and a corresponding alternate I frame are the same or at least interchangeable, the actual I frame for the first full GOF may come from the alternate frame buffer 30 or main frame buffer 28. As such, frames can be pulled from any location within the main or alternate frame buffers 28, 30 at any given time to facilitate rapid initiation of frame streaming.

Figure 4B:
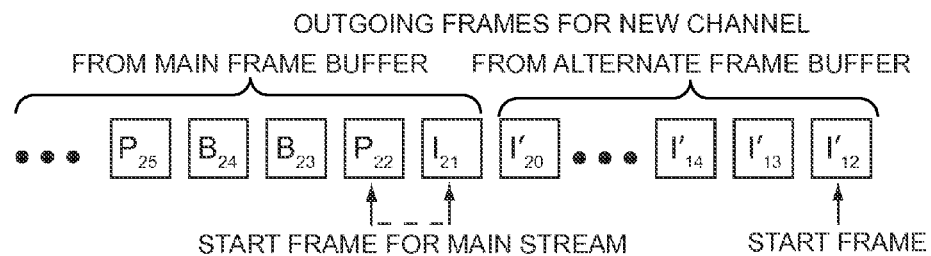
FIG. 4B illustrates the outgoing frames for the new channel according to the second embodiment of the present invention.

The initial frames that are streamed toward the CPE 14 for the example of FIG. 4A are provided in FIG. 4B. The start frame pulled from the alternate frame buffer 30 is alternate I frame, $I'_{12}$, which is effectively an intra-coded version of P frame $P_{12}$ of the main frame stream. Since the first I frame to appear in the main frame buffer 28 is I frame $I_{21}$, the alternate I frames, $I'_{13}$ through $I'_{20}$ or $I'_{21}$, from the start frame to the first I frame in the main frame buffer 28, are streamed in sequence after the start frame. Once the first I frame for the main frame stream is reached, the main frame buffer 28 is used for streaming. For the first I frame of the first GOF, the I frame, $I_{21}$ may be pulled from the main frame buffer 28, or the alternate I frame $I'_{21}$ may be pulled from the alternate frame buffer 30. Thus, after I frame $I_{21}$ or alternate I frame $I'_{21}$ is streamed, P and B frames $P_{22}$, $B_{23}$, $B_{24}$, $B_{25}$, and so on and so forth are streamed from the main frame buffer 28 for the first GOF. All subsequent frames for subsequent GOFs are also streamed from the main frame buffer 28.

In a third embodiment of the present invention, two streams of frames are provided for each of at least certain channels. Each stream represents the same content. As illustrated in FIG. 5A, a first frame stream is the main frame stream, which is encoded to provide a series GOFs, each of which includes an I frame and the associated dependent frames, such as the B and P frames. The second frame stream is an alternate I frame stream and is encoded to provide a series of alternate I frames, wherein each of the alternate I frames corresponds to one of the I, B, or P frames of the main frame stream. In one embodiment, the I frames of the main frame stream are the essentially the same as the corresponding alternate I frames of the alternate I frame stream. Further, the alternate I frames that correspond to the B and P frames of the main frame stream are intra-coded (I frame) versions of the corresponding B and P frames. These alternate I frames may be of a lesser quality than the original versions of the corresponding B and P frames. All of the frames in the alternate I frame stream may be I frames, as depicted. Further, the alternate I frames may be generated from the frames of the main frame stream or received separate therefrom.

When a new channel is requested, streaming of frames toward the customer premise equipment 14 of the user is commenced immediately beginning with the first alternate I frame $I'_{21}$ in the alternate frame stream, if the first frame in the main frame stream is not an I frame. In this example, the first frame in the main frame stream is P frame $P_{12}$. When the first I frame $I_{21}$ in the main frame stream arrives, streaming is switched from the alternate frame stream to the main frame stream. If the first frame in the main frame stream is an I frame when a new channel is requested, streaming of frames toward the customer premise equipment 14 commences with the first frame in the main frame stream.

The initial frames that are streamed toward the CPE 14 for the example of FIG. 5A are provided in FIG. 5B. The start frame pulled from the alternate frame stream is alternate I frame, $I'_{12}$, which is effectively an intra-coded version of P frame $P_{12}$ of the main frame stream. Since the first I frame to appear in the main frame stream is I frame $I_{21}$, the alternate I frames, $I'_{13}$ through $I'_{20}$ or $I'_{21}$, from the start frame to the first I frame in the main frame stream are streamed in sequence after the start frame. Once the first I frame for the main frame stream is reached, the main frame stream is used for streaming. For the first I frame of the first GOF, the I frame, $I_{21}$ may be pulled from the main frame stream, or the alternate I frame $I'_{21}$ may be pulled from the alternate frame stream. Thus, after I frame $I_{21}$ or alternate I frame $I'_{21}$ is streamed, P and B frames $P_{22}$, $B_{23}$, $B_{24}$, $B_{25}$, and so on and so forth are streamed from the main frame stream for the first GOF. All subsequent frames for subsequent GOFs are also streamed from the main frame stream.

In a fourth embodiment of the present invention, multiple frame streams are provided for each of a number of channels. For the example illustrated in FIG. 6A, a given channel is associated with five frame streams: a main stream and four alternate frame streams (1-4). Each frame stream for a given channel is delayed in time from the other frame streams for the given channel by a delay time. Notably, the delay time is a fraction of the period of a single GOF. Each frame stream for a given channel is essentially identical, and is encoded to provide a series GOFs, each of which includes an I frame and the associated B and P frames. When a new channel is requested at time $T_{CR}$, the frame stream that will provide an I frame with the least delay is selected as the frame stream to use for streaming frames toward the CPE 14. Assuming the request for a new channel is received at time $T_{CR}$, alternate frame stream 3 is the frame stream that will provide the next I frame, $I_{21}$, with the least delay. Thus, the frame stream to use for streaming frames toward the CPE 14 is alternate stream 3. Once alternate frame stream 3 is selected in response to the new channel request, streaming may start immediately or upon receiving the next I frame, $I_{21}$. FIG. 6B illustrates the frame sequence for responding to a request for a new channel at time $T_{CR}$. If streaming starts immediately, B frame $B_{20}$, is the start frame and is followed by the I frame $I_{21}$, P frame $P_{22}$, B frame $B_{23}$, and so on and so forth. Again, streaming may start upon receipt of first I frame $I_{21}$, since the preceding B frame $B_{20}$, cannot be decoded without its associated I frame, which is no longer available.

The duplicated and time-shifted frame streams may be individually provided by the media source 12 or other network entity, or may be generated from a series of frame buffers, wherein each successive frame buffer stores a time-shifted portion of the content stream. The frame buffers for each of these embodiments are used to buffer ever-changing portions of continuously streamed content, and thus are periodically or continuously updated as content is received and shifted through the memory locations of the frame buffers, as will be appreciated by those skilled in the art. Those skilled in the art will recognize alternative buffering techniques that are applicable for the present invention.

Figure 7A:
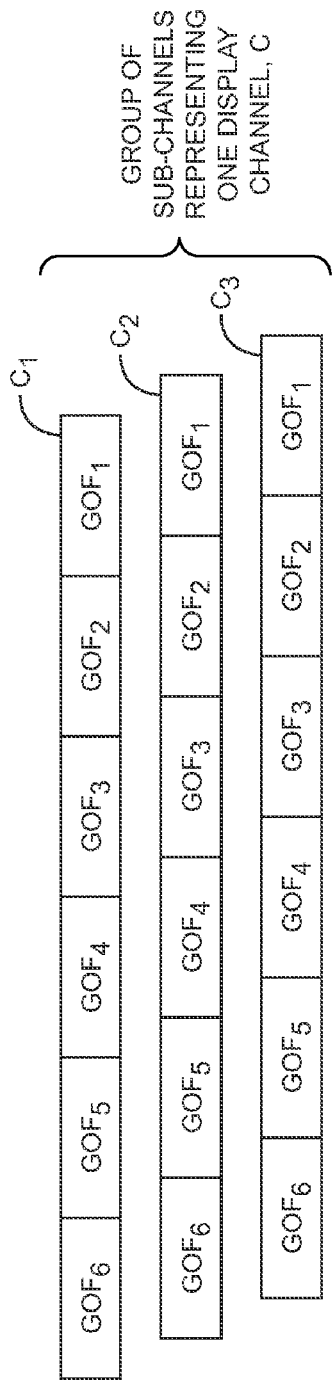
FIG. 7A illustrates multiple sub-channels that represent a channel and are delayed with respect to another according to one embodiment of the present invention.

A fifth embodiment of the present invention, which is similar to the preceding embodiment is illustrated in FIG. 7A. As illustrated, a given channel C is represented by a group of sub-channels, $C_1$, $C_2$, $C_3$. The sub-channels $C_1$, $C_2$, $C_3$ are essentially identical, and are encoded to provide a series of GOFs, each of which includes an I frame and the associated B and P frames. Each of the sub-channels $C_1$, $C_2$, $C_3$ is a frame stream for the given channel C and is delayed in time from the other sub-channels $C_1$, $C_2$, $C_3$ by a delay time.

Preferably, the delay time is a fraction of the period of a single GOF. As illustrated, sub-channel C2 is delayed one-third of a GOF from sub-channel $C_3$, and sub-channel $C_1$ is delayed one-third of a GOF from sub-channel $C_2$. Multiple frame buffers, the media source 12, or other network entities may be employed to provide or process a single frame stream for channel C, generate the respective frame streams for sub-channels $C_1$, $C_2$, $C_3$, and deliver the sub-channels toward a termination point 32, which may be located anywhere along the streaming media environment, such as in the access node 26.

Figure 7B:
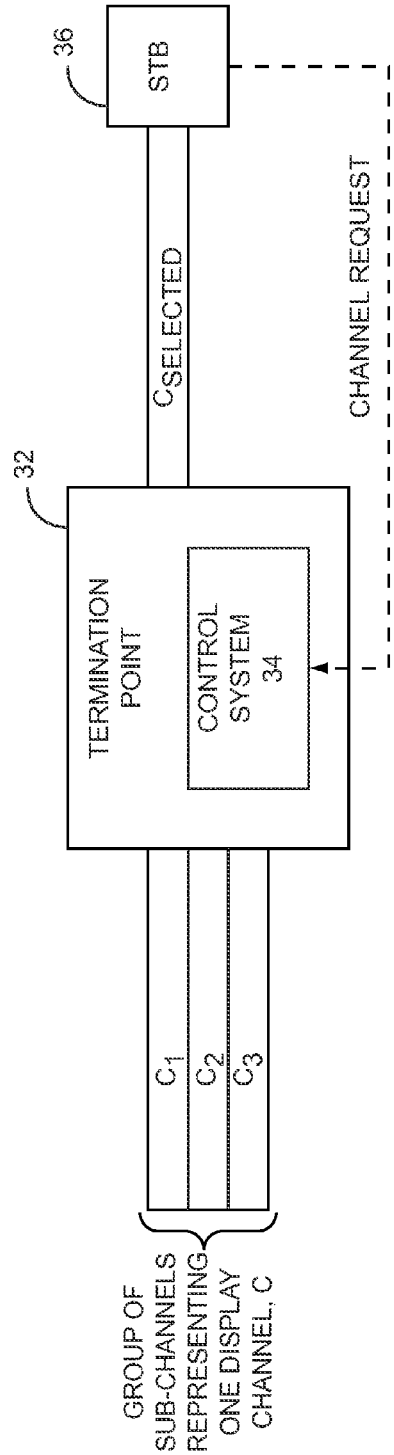
FIG. 7B illustrates selecting one of the multiple sub-channels for delivery to a requestor according to one embodiment of the present invention.

As illustrated in FIG. 7B, each of the sub-channels $C_1$, $C_2$, $C_3$ is ultimately received at the termination point 32. A control system 34 of the termination point 32 will monitor each of the incoming sub-channels $C_1$, $C_2$, $C_3$ and determine when new GOFs arrive, preferably by detecting the receipt of an I frame, for each of the sub-channels $C_1$, $C_2$, $C_3$. At any given time, the control system 34 is able to identify the sub-channel $C_N$ with the oldest GOF. The sub-channel $C_N$ with the oldest GOF is the sub-channel $C_N$ on which a new GOF has least recently arrived at the control system 34. In other words, the sub-channel $C_1$, $C_2$, $C_3$ that has gone the longest at any given time without providing a new GOF is the sub-channel $C_N$ with the oldest GOF. Notably, the sub-channel $C_N$ with the oldest GOF is the next sub-channel $C_N$ to provide a new GOF, if the GOFs are of the same length. The process will repeat for each subsequent channel change, wherein each channel will be represented by multiple sub-channels.

In response to receiving a channel selection request for channel C from CPE 14, such as a set top box (STB) 36, the control system 34 responds by selecting the sub-channel $C_{SELECTED}$ with the oldest GOF from the sub-channels $C_1$, $C_2$, $C_3$. The frame stream for the selected sub-channel $C_{SELECTED}$ is then delivered to the STB 36 wherein the next and subsequent GOFs in the frame stream are provided to the STB 36 in their entireties for decoding and presentation to a subscriber.

Figure 8A:
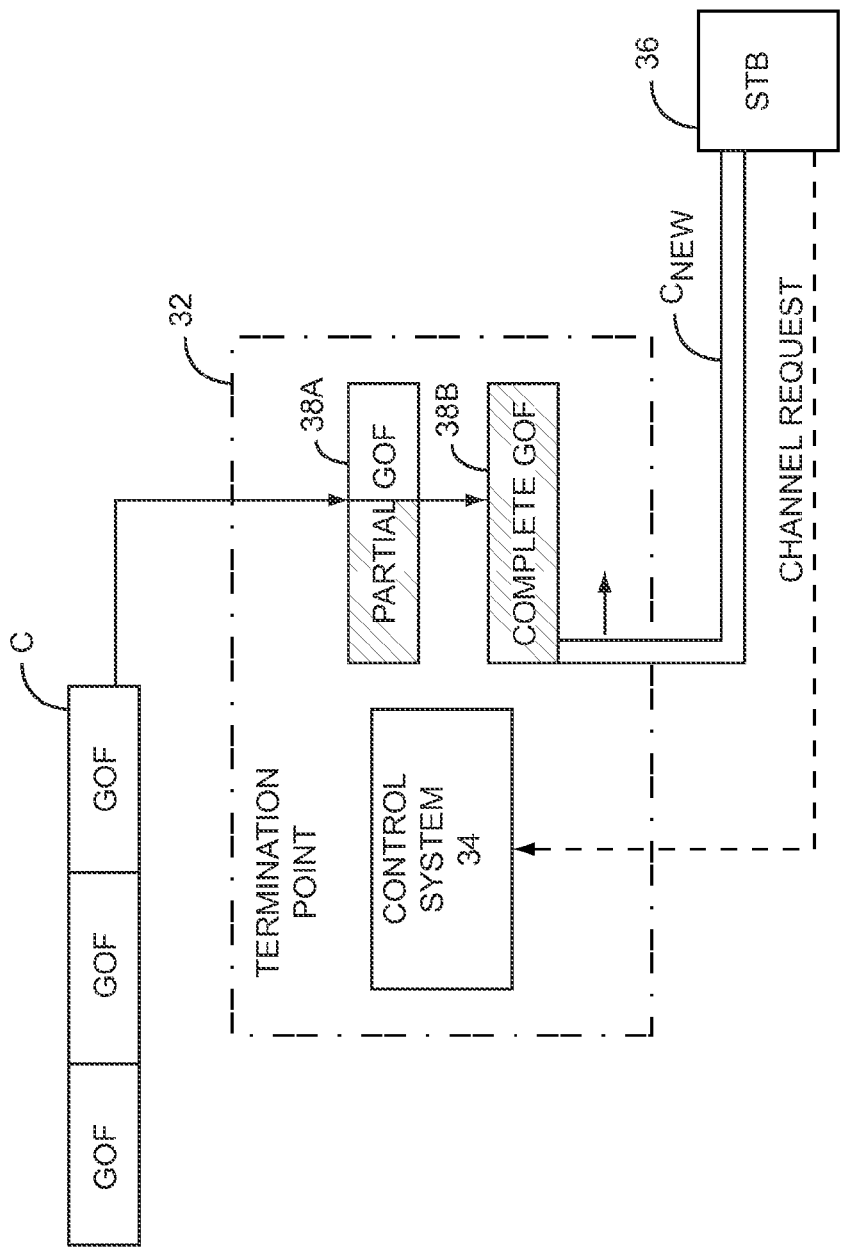
FIGS. 8A and 8B illustrate the use of multiple frame buffers to alternately store sequential groups of frames according to one embodiment of the present invention.

In a sixth embodiment of the present invention, the termination point 32 is associated with a pair of frame buffers 38A, 38B for buffering GOFs, as illustrated in FIG. 8A. The GOFs in a frame stream for a particular media stream are generally the same length, and as such, each GOF will have same number of frames. However, different media streams may employ GOFs of different lengths wherein a first media stream may have GOFs of a first length while a second media stream may have GOFs of a second length. The frame buffers 38A, 38B are either the same size as a GOF or larger than a GOF and may vary in length based on the length of the GOFs for the media stream being buffered. As GOFs from a first media stream, channel C, are received, the frame buffers 38A, 38B are alternately filled with sequential GOFs of the channel C. For example, once frame buffer 38A is filled with a first GOF of the channel C, frame buffer 38B starts being filled with a second GOF. Once frame buffer 38B is filled with the second GOF, frame buffer 38A starts being filled with a third GOF, and so on and so forth. Generally, one frame buffer 38A, 38B will contain a complete GOF while the other is being filled with a subsequent GOF.

The frame buffers 38A, 38B are filled as the frames for a GOF to be buffered are received. Once frame buffer 38A is filled with one GOF, the control system 34 will begin filling frame buffer 38B with the next GOF as the frames for the next GOF are received. If the frame buffers 38A, 38B are the same size as the GOFs, the control system 34 may begin filling frame buffer 38B once frame buffer 38A is full, and vice versa. Alternatively, the control system 34 may be able to detect the beginning or end of a GOF, and switch from filling one frame buffer 38A, 38B to filling another accordingly.

Preferably, the I frames of the GOFs are stored at the beginning of the frame buffers 38A, 38B. Upon receiving a channel selection request for channel C from the STB 36, the control system 34 will select the frame buffer 38A, 38B that contains a complete GOF and begin streaming the frames of the complete GOF for the newly selected channel, $C_{NEW}$, from the beginning of the selected frame buffer 38A, 38B toward the STB 36. While the frames for the complete GOF are being streamed from the selected frame buffer 38A, 38B, the other frame buffer 38A, 38B is being filled with the frames of the next GOF. Once streaming begins, the control system 34 will switch from one frame buffer 38A, 38B to the other as each complete GOF in the frame buffer 38A, 38B is streamed toward the STB 36. As such, the control system 36 switches between the frame buffers 38A, 38B for each successive GOF that is streamed toward the STB 36.

As indicated, the GOFs for different media streams may vary in length. When media streams are changed, such as when one channel is switched for another, the buffers 38A and 38B will begin buffering GOFs as described above for the new media stream. If the GOFs for the new media stream are a different length than the previous media stream, the length of the buffers 38A and 38B may dynamically change in a corresponding fashion. As such, upon detection of a new I-frame for the new media stream, the length of the GOFs for the new media stream may be determined and used to adjust the length of the buffers 38A and 38B. The process of alternately buffering every other GOF of the new media stream in the resized buffers 38A and 38B will proceed as described above.

Figure 8B:
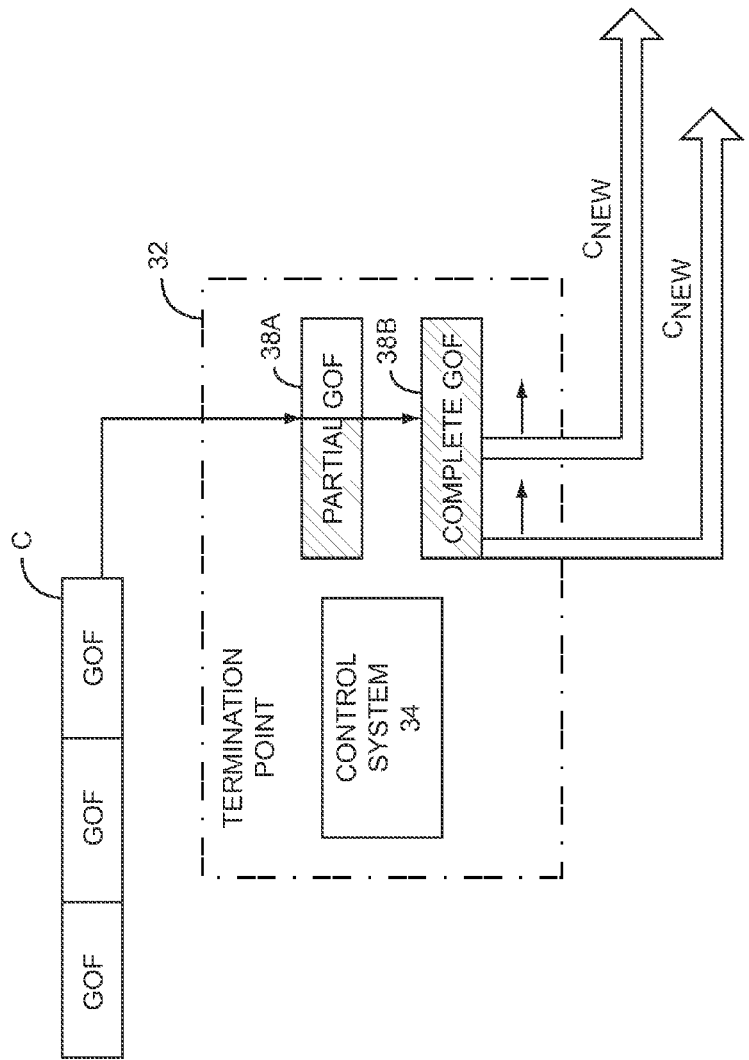

As illustrated in FIG. 8B, multiple frame streams for a newly selected channel $C_{NEW}$ may be delivered from a given frame buffer 38A, 38B at any given time. Each of the multiple frame streams may be initiated from the beginning of the frame buffer 38A, 38B, which has a complete GOF at different times, as depicted, while the other frame buffer 38A, 38B is being filled with the next GOF. The different frame streams may be delivered to different CPEs 14.

In addition to encoding media content to effectively compress the data representing the media and save bandwidth during transmission and storage, the media content may be encrypted using one or more keys to protect the integrity of the content. In general, the media content is encrypted prior to delivery, and then decrypted upon receipt for playback. Encryption and decryption generally rely on keys, which are used for both encrypting the media content and decrypting the encrypted media content. In many instances, the keys used to encrypt media content are periodically changed throughout a given program. For example, the encryption for a given television program may change in a random or periodic fashion. The encryption is generally changed by changing the key or keys used to encrypt the media content. Generally, the encryption algorithm stays the same.

The keys used to encrypt media content or related material must generally be provided to the CPE 14 by the media source 12 or other remote entity. In many instances, the keys are provided in association with the media stream by either embedding the keys into the media stream or providing a separate communication session for delivering the keys. Notably, the keys need not be delivered in real time along with the media content.

Another issue associated with changing channels in an IPTV system arises when a new channel is requested and the requested channel is encrypted. As such, a key is needed to decrypt the media stream for the newly requested channel. Regardless of how fast the media stream is delivered in response to the request for the new channel, the media cannot be presented to the user before the requisite key is provided to the CPE 14 of the user.

In many instances, the key used for encryption is changed every X number of frames. Generally, the key required for decrypting a sequence of frames is provided before the sequence of frames is delivered to the CPE 14 of the user. When a new channel is requested, the mechanism for delivering the key required to decrypt the current sequence of frames may no longer be available to the CPE 14 of the user at all or within a reasonable amount of time. Thus, a significant delay may be incurred while the CPE 14 waits for the key necessary for decrypting a subsequent sequence of frames. For example, if a first key is required to decrypt a first sequence of frames and a new channel request is responded to during delivery of that first sequence of frames, the first sequence of frames cannot be decrypted by the CPE 14 without the key. Thus, the CPE 14 may have to wait for the second sequence of frames and a corresponding key to use for decrypting the second sequence of frames. Generally, key retrieval techniques that would allow the CPE 14 to obtain the first key during delivery of the first sequence of frames injects significant delay in the channel change process. Accordingly, the present invention provides a technique for buffering keys that are used to encrypt different sequences of frames and rapidly provide these keys in the middle of delivering a sequence of frames when responding to a channel change.

Figure 9:
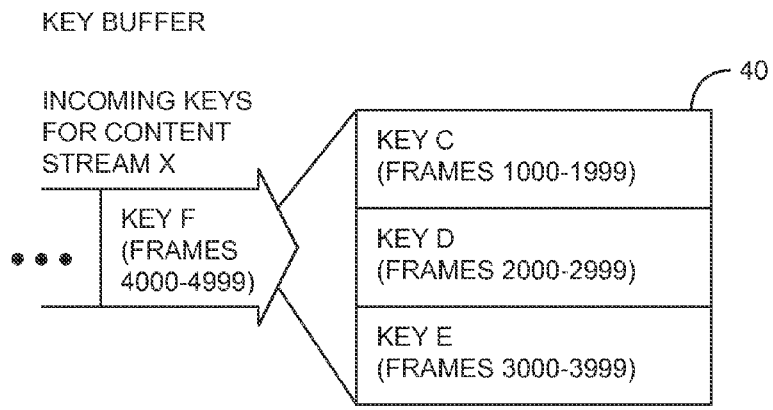
FIG. 9 illustrates a key buffer according to one embodiment of the present invention.

With reference to FIG. 9, assume a key buffer 40 is configured to store multiple keys associated with multiple sequences of frames. The keys are cycled through the key buffer 40 as corresponding frames are made available for streaming to CPE 14 of various users. As illustrated, keys C, D, and E are stored in the key buffer 40, and respectively correspond to frames 1000-1999, frames 2000-2999, and frames 3000-3999. Notably, the key buffer 40 is constantly receiving new keys that are associated with a given content stream X. For example, the next incoming key, key F, is associated with frames 4000-4999 of content stream X. Thus, frames 1000-1999 of content stream X require key C for decryption; frames 2000-2999 of content stream X require key D for decryption; and so on.

Figure 10:
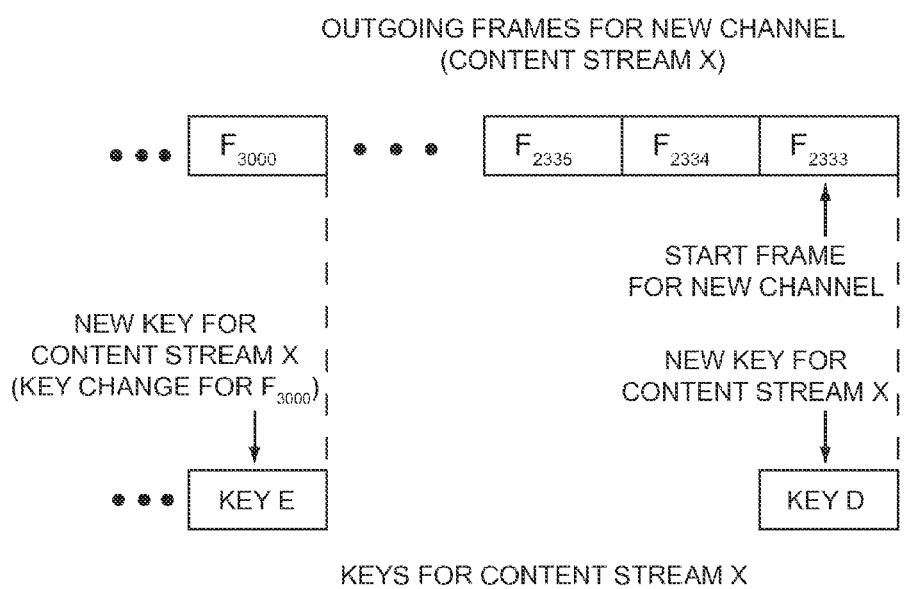
FIG. 10 illustrates outgoing frames for the new channel including keys from the key buffer illustrated in FIG. 7.

With reference to FIG. 10, when a request for a new channel is received, a start frame for the new channel is selected and frames are streamed toward the CPE 14 beginning with the start frame. As illustrated, assume the start frame for the new channel is frame $F_{2333}$. Accordingly, the first frame received for content stream X by the CPE 14 will be frame $F_{2333}$. To decode frame $F_{2333}$, the CPE 14 will need key D. As such, as the start frame is selected in response to a request for a new channel, the corresponding key, key D, is selected from the key buffer 40 and sent toward the CPE 14 in association with the stream of frames for content stream X. Key D may be embedded in the content stream X or provided to the CPE 14 via a separate session. In either case, the present invention is able to maintain keys such that an appropriate key may be obtained and sent toward the CPE 14 along with the initial frames for the new content stream.

In the illustrated example, key D will be used to decode frames $F_{2333}$-$F_{2999}$. For frames 3000-3999, a different key, key E, is presented to the CPE 14 through normal key updates or via the key provisioning techniques provided herein. Notably, the key buffer 40 may operate in association with the main or alternate stream buffers 28, 30, respectively, and the frame delivery techniques described above.

Figure 11:
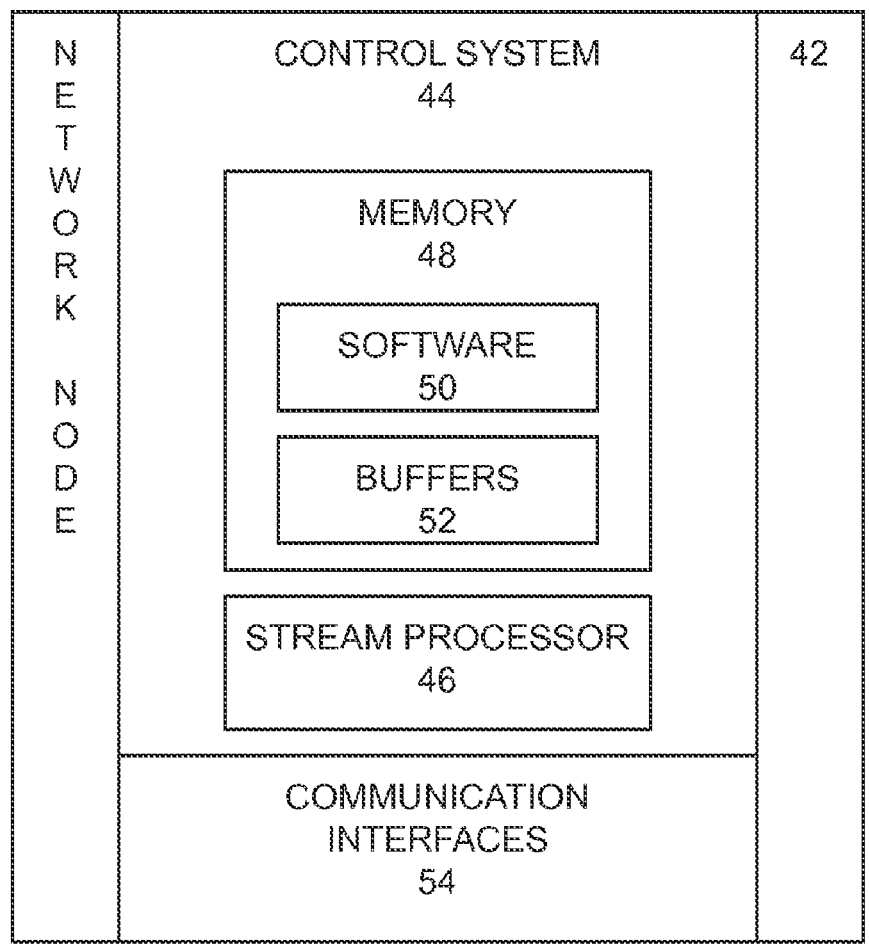
FIG. 11 is a block representation of a network node according to one embodiment of the present invention.

Turning now to FIG. 11, a network node 42, which is capable of implementing the functionality described above for controlling frame streaming initiation, as well as key maintenance and delivery, is illustrated. Notably, the network node 42 may take the form of an edge node 22, an access node 26, a customer gateway 16, or other entity found in the core network 18, edge network 20, or access network 24. The network node 42 will include a control system 44 that provides a stream processor 46 for receiving incoming media streams, processing the media streams, and delivering the media streams as described above. Given the speed at which the stream processor 46 must operate, the stream processor 46 may be implemented in hardware or firmware, such as an application-specific integrated circuit, which functions in association with the overall control system 44. The control system 44 may also include memory 48 with sufficient software 50 and buffers 52 to facilitate the functionality described above. The buffers 52 may be implemented in the stream processor 46 or in close association therewith, such that a main stream buffer 28, alternate stream buffers 30, or key buffers 40 may be implemented. The control system 44 and the stream processor 46 may be associated with one or more communication interfaces 54 to facilitate the receipt and delivery of packets that represent the media frames of various media streams.

Those skilled in the art will recognize improvements and modifications to the preferred embodiments of the present invention. All such improvements and modifications are considered within the scope of the concepts disclosed herein and the claims that follow.

The invention claimed is:
1. A method comprising:
receiving a sequence of frame groups for a channel;
alternately and repeatedly buffering the sequence of frame groups in a first buffer and second buffer, wherein once one frame group of the sequence of frame groups is completely buffered in one of the first buffer and the second buffer, another of the first buffer and the second buffer begins filling with a subsequent frame group that immediately follows the one frame group;
receiving a request from a requestor to receive the channel;

upon receiving the request, determining which one of the first buffer and the second buffer contains a complete frame group, and which one of the first buffer and the second buffer contains a partial subsequent frame group; and initiating delivery by transmitting from the determined one of the first buffer and the second buffer containing the complete frame group.

2. The method of claim 1 further comprising continuing delivery of frame groups that follow the delivered frame groups in the sequence of frame groups toward the requestor from alternating ones of the first buffer and the second buffer.

3. The method of claim 1 wherein once the subsequent frame group that immediately follows the one frame group is buffered, buffering a second subsequent frame group that immediately follows the subsequent frame group in the one of the first buffer and the second buffer that contained the one frame group.

4. The method of claim 1 wherein the first buffer and second buffer are identical in length with the frame groups of the sequence of frame groups.

5. The method of claim 1 wherein alternately and repeatedly buffering the sequence of frame groups in the first buffer and the second buffer comprises:
(a) determining when the one of the first buffer and the second buffer that is buffering the one frame group of the sequence of frames is full,
(b) upon determining when the one of the first buffer and the second buffer that is buffering the one frame group of the sequence of frames is full, immediately begin filling the other of the first buffer and the second with the subsequent frame group that immediately follows the one frame group; and
repeating steps (a) and (b) until the requestor requests a new channel.

6. The method of claim 1 wherein frame groups for different media streams have different lengths and a length of the first buffer and the second buffer changes based on the length of the frame groups in the different media streams.

7. The method of claim 1 wherein each frame group in the sequence of frame groups comprises an intra-coded frame and at least one dependent frame that depends on the intra-coded frame, and wherein the sequence of frames is transmitted to a plurality of requestors, the plurality of requestors including the requestor.

8. The method of claim 7 wherein each frame group that is stored in the first buffer and the second buffer is stored such that the intra-coded frame is stored at a beginning of the first buffer and the second buffer; and wherein the one frame group has a first length and the subsequent frame group has a second length different than the first length.

9. The method of claim 7 wherein alternately buffering the sequence of frame groups in a first buffer and a second buffer comprises:
detecting the intra-coded frame for the subsequent frame group; and
upon detecting the intra-coded frame for the subsequent frame group, switching from buffering the one frame group of the sequence of frames in one of the first buffer and the second buffer to buffering the subsequent frame group in the other of the first buffer and the second buffer.

10. The method of claim 1 wherein frames of the sequence of frame groups are encoded using a Motion Pictures Expert Group (MPEG) encoding scheme.

11. The method of claim 1 wherein the channel is provided by an Internet Protocol Television (IPTV) service.

12. A method comprising:
buffering a plurality of first incoming frames for a first media stream in a first frame buffer that has a plurality of first buffer locations for storing the plurality of first incoming frames, the plurality of first incoming frames including an oldest buffered first incoming frame buffered in a beginning first buffer location of the plurality of first buffer locations, the oldest buffered first incoming frame being an inter-coded frame, wherein the plurality of first incoming frames pass through the first frame buffer over time as the plurality of first incoming frames are received;
receiving a first request from a requestor to receive the first media stream;
upon receiving the first request, identifying a most recently buffered intra-coded frame of the plurality of first incoming frames that are stored in the first frame buffer, the most recently buffered intra-coded frame being buffered in one of the plurality of first buffer locations different than the beginning first buffer location; and
beginning with the most recently buffered intra-coded frame of the plurality of first incoming frames, initiating delivery of the plurality of first incoming frames for the first media stream toward the requestor.

13. The method of claim 12 wherein the most recently buffered intra-coded frame is located at a given buffer location within the plurality of buffer locations when the first request is received, and the plurality of first incoming frames are delivered toward the requestor via the given buffer location to expedite delivery of the plurality of first incoming frames for the first media stream.

14. The method of claim 12 further comprising:
buffering a plurality of second incoming frames for a second media stream in a second frame buffer that has a plurality of second buffer locations for storing the plurality of second incoming frames, the second frame buffer storing an oldest buffered second incoming frame, the oldest buffered second incoming frame being an inter-coded frame, wherein the plurality of second incoming frames pass through the second frame buffer over time as the plurality of second incoming frames are received;
after delivery of the plurality of first incoming frames for the first media stream is initiated, receiving a second request from the requestor to receive the second media stream;
upon receiving the second request, identifying an intra-coded frame of the plurality of second incoming frames that are stored in the second frame buffer; and
beginning with the select intra-coded frame of the plurality of second incoming frames, initiating delivery of the plurality of second incoming frames for the second media stream toward the requestor.

15. The method of claim 14 wherein the first media stream and the second media stream represent two of a plurality of streaming media content channels available to the requestor.

16. The method of claim 15 wherein the plurality of streaming media content channels provide an Internet Protocol Television (IPTV) service.

17. The method of claim 12 wherein the plurality of first incoming frames comprise a plurality of frame groups, wherein each frame group comprises an intra-coded frame and a plurality of inter-coded frames, which depend directly or indirectly from the select intra-coded frame.

18. The method of claim 12 wherein a most recently buffered first intra-coded frame to appear in the first frame buffer is stored in between inter-coded frames.

19. A method comprising:
  storing first incoming frames for a first media stream in a first buffer, the first incoming frames comprising intra-coded frames and inter-coded frames, which depend on an associated intra-coded frame, the first buffer storing an oldest buffered first incoming frame of the first incoming frames, the oldest buffered first incoming frame being an inter-coded frame;
  storing second incoming frames for the first media stream in a second buffer, wherein the second incoming frames comprise alternate intra-coded frames which correspond to the intra-coded frames and the inter-coded frames of the first incoming frames;
  receiving a first request from a requestor to receive the first media stream;
  upon receiving the first request, initiating delivery of the second incoming frames toward the requestor; and
  upon reaching an alternate intra-coded frame of the second incoming frames that corresponds to an intra-coded frame of the first incoming frames, switching from delivering the second incoming frames toward the requestor to delivering the first incoming frames toward the requestor starting with any one of the first incoming frames but the oldest buffered first incoming frame.

20. The method of claim 19 further comprising, upon reaching the alternate intra-coded frame of the second incoming frames that corresponds to an intra-coded frame of the first incoming frames, halting delivery of the second incoming frames toward the requestor.

21. The method of claim 19 wherein the alternate intra-coded frame of the second incoming frames that corresponds to an intra-coded frame of the first incoming frames is delivered toward the requestor.

22. The method of claim 19 wherein the intra-coded frame of the first incoming frames that corresponds to the alternate intra-coded frame of the second incoming frames is delivered toward the requestor.

23. The method of claim 19 further comprising:
  receiving third incoming frames for a second media stream wherein the third incoming frames comprise intra-coded frames and inter-coded frames, which depend on an associated intra-coded frame;
  receiving fourth incoming frames for the second media stream wherein the fourth incoming frames comprise alternate intra-coded frames, which correspond to the intra-coded frames and the inter-coded frames of the third incoming frames;
  receiving a second request from a requestor to receive the second media stream;
  upon receiving the second request, initiating delivery of the fourth incoming frames toward the requestor; and
  upon reaching an alternate intra-coded frame of the fourth incoming frames that corresponds to an intra-coded frame of the third incoming frames, switching from delivering the fourth incoming frames toward the requester to delivering the third incoming frames toward the requestor.

24. The method of claim 23 wherein the first media stream and the second media stream represent two of a plurality of streaming media content channels available to the requestor.

25. The method of claim 19 wherein the first and second incoming frames are encoded using a Motion Pictures Expert Group (MPEG) encoding scheme.

26. The method of claim 19 wherein the second incoming frames are encoded at a quality that is less than that of the first incoming frames.

* * * * *